United States Patent
Farkas et al.

(10) Patent No.: US 9,319,871 B2
(45) Date of Patent: Apr. 19, 2016

(54) ALLOCATING IDENTIFIERS TO COMMUNICATION DEVICES

(75) Inventors: Lorant Farkas, Budapest (HU); Attila Molnar, Göd (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 243 days.

(21) Appl. No.: 13/989,510

(22) PCT Filed: Dec. 2, 2010

(86) PCT No.: PCT/EP2010/068761
§ 371 (c)(1),
(2), (4) Date: Jul. 8, 2013

(87) PCT Pub. No.: WO2012/072142
PCT Pub. Date: Jun. 7, 2012

(65) Prior Publication Data
US 2013/0279458 A1  Oct. 24, 2013

(51) Int. Cl.
*H04W 4/00* (2009.01)
*H04W 8/26* (2009.01)
*H04W 76/02* (2009.01)
*H04L 29/12* (2006.01)
*H04W 4/14* (2009.01)
*H04W 8/20* (2009.01)

(52) U.S. Cl.
CPC .......... *H04W 8/26* (2013.01); *H04L 29/12273* (2013.01); *H04L 29/12896* (2013.01); *H04L 61/2053* (2013.01); *H04L 61/605* (2013.01); *H04W 4/005* (2013.01); *H04W 76/021* (2013.01); *H04L 29/12188* (2013.01); *H04L 61/1588* (2013.01); *H04W 4/14* (2013.01); *H04W 8/20* (2013.01)

(58) Field of Classification Search
CPC .......... H04W 8/20; H04W 8/26; H04W 4/005; H04W 4/14; H04W 76/021; H04L 29/12273; H04L 29/12896; H04L 29/12188
See application file for complete search history.

(56) References Cited

U.S. PATENT DOCUMENTS

2010/0273462 A1* 10/2010 Thorn et al. ............... 455/414.1

FOREIGN PATENT DOCUMENTS

| WO | WO 2008/135087 A1 | 11/2008 |
| WO | WO 2009/026170 A2 | 2/2009 |
| WO | WO 2009/122219 A1 | 10/2009 |

OTHER PUBLICATIONS

International Search Report and Written Opinion dated Oct. 26, 2011 corresponding to International Patent Application No. PCT/EP2010/068761.

* cited by examiner

*Primary Examiner* — Anh Ngoc Nguyen
(74) *Attorney, Agent, or Firm* — Squire Patton Boggs (US) LLP

(57) ABSTRACT

A method of allocating a routing identifier to a subscription (FIG. 2) in order for an application server (218) to be able to send a message to or call a mobile terminal (108) comprising the steps of sending a request for the routing identifier from the application server to a subscription database (step 1); selecting a routing identifier (steps 2 and 3); using the request to create an association between the routing identifier and a subscription identifier in the subscription database (steps 2 and 3); and de-allocating the routing identifier once message sending or calling is complete (step 7).

11 Claims, 3 Drawing Sheets

ALLOCATING IDENTIFIERS TO COMMUNICATION DEVICES

This invention relates to allocating identifiers to communication devices. It is particularly, but not exclusively, refated to allocating identifiers to mobile terminal devices. It may relate to allocating routing identifiers.

Machine-to-machine (M2M) wireless communications has potential to provide enhanced mobile data revenue for operators of mobile communications systems. A typical mobile M2M messaging system is capable of establishing a wireless communications link to connect an M2M device or a group of M2M devices, for example a monitoring device capable of providing measurements to a service provider, to an M2M server for the purpose of transmitting data between the M2M server and one or more M2M devices. This emerging M2M market provides the opportunity for mobile-enabled devices (present in, or in the form of, cars, utility meters, vending machines and consumer electronics devices) to communicate with M2M servers over a wireless network.

An M2M application server (AS) is a server capable of carrying out a number of operations including provisioning M2M devices, and configuring them in runtime (for example how often to make measurements). M2M technology can be used as the basis of a wide variety of services and applications.

The number of M2M devices is expected to exceed the number of mobile terminals by orders of magnitude in the near future. Most of the M2M devices will have an incorporated subscriber identity module (SIM) card. If all of the SIM cards from M2M devices are assigned their own Mobile Station Integrated Services Digital Numbers (MSISDNs), network operators would face a MSISDN range depletion problem: there will be fewer MSISDNs available than M2M devices requiring them.

According to a first aspect of the invention there is provided a method of allocating a routing identifier to a subscription comprising:

sending a request for the routing identifier;
selecting a routing identifier;
using the request to create an association between the routing identifier and a subscription identifier in a subscription database; and
de-allocating the routing identifier.

Preferably, the routing identifier is de-allocated so that it becomes free to be allocated to a subscription in a subsequent allocation procedure.

Preferably, the routing identifier is an MSISDN.

Preferably, the subscription is in respect of a SIM card. The subscription may not have associated with it a fixed routing identifier. The routing identifier may be generated dynamically for the subscription when there is a need for communication between a device operating according to the subscription and a network entity. The network entity may be a server. It may be an application server. It may be an M2M server.

Preferably the subscription identifier is an IMSI.

Preferably, the subscription database is an HLR. It may be an HLR platform.

Preferably, the request is sent to by a server. It may be sent by an application server. Preferably, the request is sent to a subscriber database platform. It may be sent to an HLR platform.

The routing identifier may be allocated temporarily, that is for a time period. The end of the time period may be defined by the elapse of a specific amount of time or an event occurring. De-allocation may occur as a result both of a timer having elapsed and of an event occurring. The elapse of the timer may trigger an event. This may be a modification event to a database, such as overwriting of a routing identifier. Modification of the database may trigger a notification being sent. De-allocation may occur as a result of receipt of the notification. De-allocation may occur in at least two places in a communications system. It may occur in the database as a result of the modification event. It may also occur in an entity which receives the notification.

In an embodiment of the invention, there may be a trigger to send a notification when there is a reading access to the subscription database. It may be, for example, when the address of the serving network element of a device is accessed.

In another embodiment of the invention, de-allocation may occur when an entity which originally requested allocation receives an indication that the purpose for which allocation was requested has been met.

The request for the routing identifier may contain a subscription identifier. This may be an IMSI. It may be a device ID. If it is a device ID, then it is considered to be a subscription in respect of the device from the perspective of an entity using the device in providing a service.

The routing identifier may be allocated to a wireless device such as a mobile terminal. It may be allocated to an M2M device. The mobile terminal may be configured with a device ID, an address of a server, and an address of a messaging centre.

The routing identifier may be allocated in a subscription data management platform having a centralised database for customer profile and service information. The platform may comprise a database application which interacts with a database, a notification function, and a front-end function which enables servers to communicate with the platform.

A server may be configured to contain records for devices associating together a device ID and a subscription identifier.

The request may request a routing identifier from a pool of routing identifiers.

After receiving the request, the server may set up a notification service for changes to the routing identifier in respect of a particular subscription.

In response to the request, an identifier present in the request may be used to look up an association between that identifier and a subscription identifier to which it corresponds.

In response to the request, an allocated routing identifier may be allocated and provided to the subscription database, or an entity controlling the subscription database, with an indication that it relates to a particular subscription identifier so that a subscription record in the subscription database can be modified to include the routing identifier. A message containing an identifier relating to a device or to a subscription and the routing identifier may be sent to the originator of the request.

Allocation may be a sub-procedure in a larger procedure. There may additionally be a provisioning sub-procedure and a location notification.

In a provisioning sub-procedure, the subscription database, or an entity controlling the subscription database, may be configured with a number of routing identifiers, for example a range, which are to be available for allocation. It may be configured with correspondences between subscriber identifiers and routing identifiers. It may be configured with dummy routing identifiers which may not actually be used for routing.

Allocation may occur as part of a process of a server sending a message to a device. Allocation may occur as part of a process of a device sending a message to a server. The message may be an SMS message. Allocation may occur as part of a process of a server calling a device.

The invention may be considered to be a method for sending a message or making a call, together with a relevant server, database application, system, and computer programme product to enable this to occur.

According to a second aspect of the invention there is provided a communication system comprising:

a server being capable of sending a request for the routing identifier; and a database application being capable of receiving the request, selecting a routing identifier, allocating a routing identifier to a subscription, and using the request to create an association between the routing identifier and a subscription identifier in a subscription database, wherein following allocation the system is capable of de-allocating the routing identifier.

The database application may have a front end which is capable of communicating with the server and a database handling part capable of modifying the subscription database.

According to a third aspect of the invention there is provided a server being capable of sending a request for the routing identifier to a database application in order for the database application to select a routing identifier, allocate a routing identifier to a subscription, and to create an association between the routing identifier and a subscription identifier in a subscription database, and the server being capable of de-allocating the routing identifier.

According to a fourth aspect of the invention there is provided a database application comprising a subscription database, a front end which is capable of communicating with a server, and a database handling part capable of modifying the subscription database, the front end being capable of receiving a request for a routing identifier, selecting a routing identifier, and allocating a routing identifier to a subscription, and the database handling part capable being capable of creating an association between the routing identifier and a subscription identifier in the subscription database, wherein following allocation the database application is capable of de-allocating the routing identifier.

According to a fifth aspect of the invention there is provided a computer program product comprising software code that when executed on a computing system performs a method of allocating a routing identifier to a subscription comprising:

sending a request for the routing identifier;

selecting a routing identifier;

using the request to create an association between the routing identifier and a subscription identifier in a subscription database; and de-allocating the routing identifier.

Preferably, the computer program product has executable code portions which are capable of carrying out the steps of the method.

Preferably, the computer program product is stored on a computer-readable medium. Preferably, it is stored in a non-transient manner.

An embodiment of the invention will now be described, by way of example only, with reference to the accompanying drawings in which.

Figure 1:
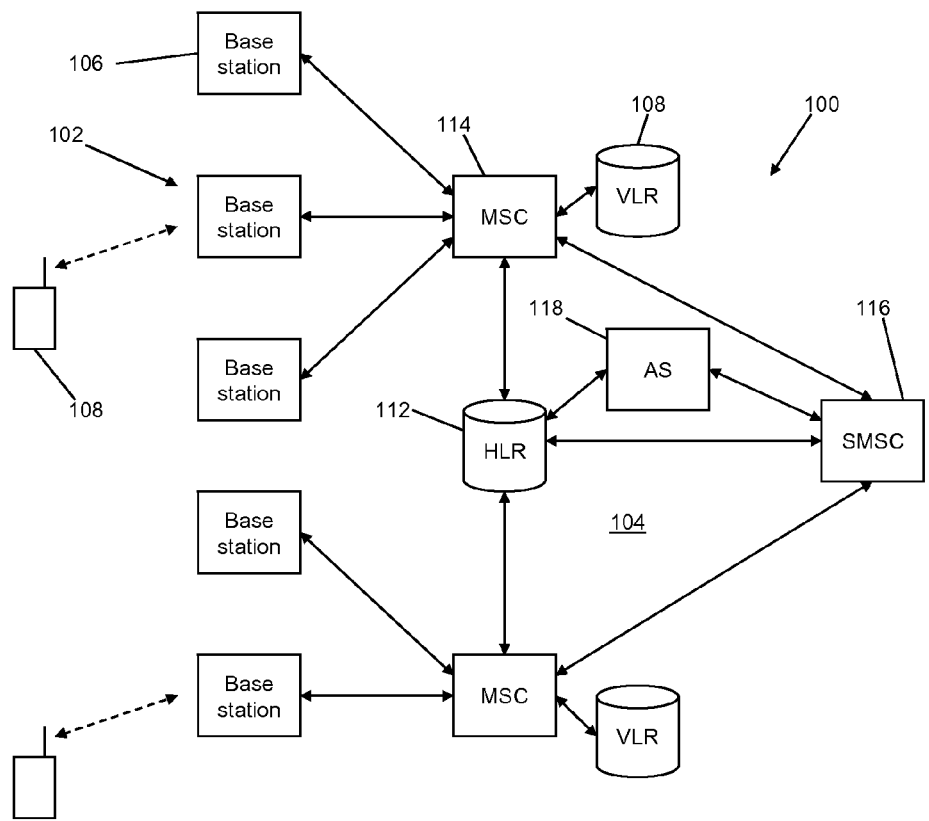
FIG. 1 shows a mobile communications system comprising the invention.

FIG. 1 shows a mobile communications system 100 comprising the invention. The system 100 comprises a RAN 102 and a core network 104. The RAN 102 has a number of base stations 106 which provide radio access to mobile terminals 108 present in cells (not shown). The core network 104 has functionality to provide for call switching/routing and call control, service provision, authentication and charging, and interconnection enabling access to other networks.

The core network 104 comprises switching entities, such as MSCs 110, for routing calls and SMS messages according to subscriber-related information contained within databases referred to as a home location register (HLR) platform 112 and a visitor location register (VLR) 114. The latter is associated with respective MSCs. The subscriber-related information may include identity (ID) information of the subscriber, the subscriber's location, and information about a subscriber's subscription such as the services which may be provided to that subscriber. The core network also has functionality for handling and delivering SMS messages to mobile terminals referred to as an SMS centre (SMSC) 116.

SMS messages may be sent from one subscriber mobile terminal to another subscriber mobile terminal or from a subscriber mobile terminal to an application server (AS) 118. In the case of the invention, the AS 118 is linked both with the HLR platform 112 in order to interact with its HLR database and with the SMSC 116 in order to arrange for the sending of SMS messages. In prior art implementations, it is not necessary for an AS to be linked with an HLR database since it may simply directly instruct an SMSC to send SMS messages. An example of a prior art implementation is an AS which is capable of sending an SMS configuration message to configure a mobile terminal.

As can be seen from the foregoing, there is one HLR platform 112 and several MSCs 110. Depending on the number of subscribers served by the network operator, "HLR functionality" may be distributed so that different HLR front-ends are configured inside each MSC, with these front-ends enabling access to a common central subscriber database, that is HLR database.

When an SMS message is sent to a destination entity, which can be a mobile terminal or a network element such as the AS 118, a request embodying the SMS is sent to an MSC 110. The MSC 110 forwards the request embodying the SMS to the SMSC 116 using a MAP_MO_FORWARD_SHORT_MESSAGE message, where it is stored. The SMSC 116 queries the HLR platform 112 to find out the location of a destination entity a using MAP_SEND_ROUTING_INFO_FOR_SM message, in particular the global title address of the serving network element of destination entity. The SMSC 116 forwards the short message to this serving network element using a MAP_MT_FORWARD_SHORT_MESSAGE message. The serving network element forwards the message to the destination entity, assuming that the destination entity is available. The forwarding consists of an inquiry of the VLR by the serving network element using a Send_Info_for_MT_SMS message. As a result the VLR will launch a page request and return the response to the serving network element. In general, an MSC and a corresponding VLR are co-located in the same platform and so this is usually implemented as internal messaging inside one platform. If the delivery of the SMS message is not successful it is stored in the SMSC 116. Typically, if the destination entity is not available for SMS delivery, the SMSC 116 will attempt to deliver the short message a number of times before the short message is deleted.

The term mobile terminals is used in a general sense to refer to terminals which are wirelessly connected and have a record kept in a mobility management entity of the mobile communications system 100. It can refer both to terminals which move and terminals which are fixed in one location.

According to the invention, there are two types of subscribers. A first type in which the subscriber is assigned a fixed, non-varying MSISDN, and a second type in which the subscriber has a non-fixed MSISDN which is generated dynamically for the subscriber when there is a need for SMS-based or call-based communication between the subscriber's device and an application server. In a specific embodiment of the invention, the subscriber is an M2M subscriber and the application server is an M2M server. An enterprise may have a number of type 1 subscriptions for employees and a much larger number of type 2 subscriptions. This would be the case if the enterprise is a logistics company, such as a delivery company, or an energy company controlling a large number of smart meters.

Dynamic generation of MSISDNs is carried out in the HLR platform 112. This is a subscriber data management (SDM) platform having a centralised database for customer profile and service information. The HLR platform 112 comprises an HLR application 220 which interacts with an HLR database 222, a notification framework 224, and a front-end (FE) application 226 which enables the M2M AS to communicate with the HLR platform 112. The notification framework 224 is a mechanism to inform an external URL about changes in the HLR database 222. The notification framework can be configured to send a notification when a particular field of a particular entry in a particular table within a particular database changes.

In terms of the invention, the HLR platform 112 enables configuration and modification of the HLR database 222 and notifications of changes and events. In a specific embodiment of the invention, the HLR platform is a Nokia Siemens Networks' One-NDS SDM platform. The One-NDS platform has a subscriber data repository which enables communications service providers (CSPs) to create personalised services for customers.

In relation to the second type of subscribers, when an SMS is sent either to or from a destination subscriber, the subscriber needs to be assigned an MSISDN. An example of this is shown in FIG. 2, in which a particular embodiment of the AS 118, that is an M2M AS 218, sends an SMS to the M2M device.

Figure 2:
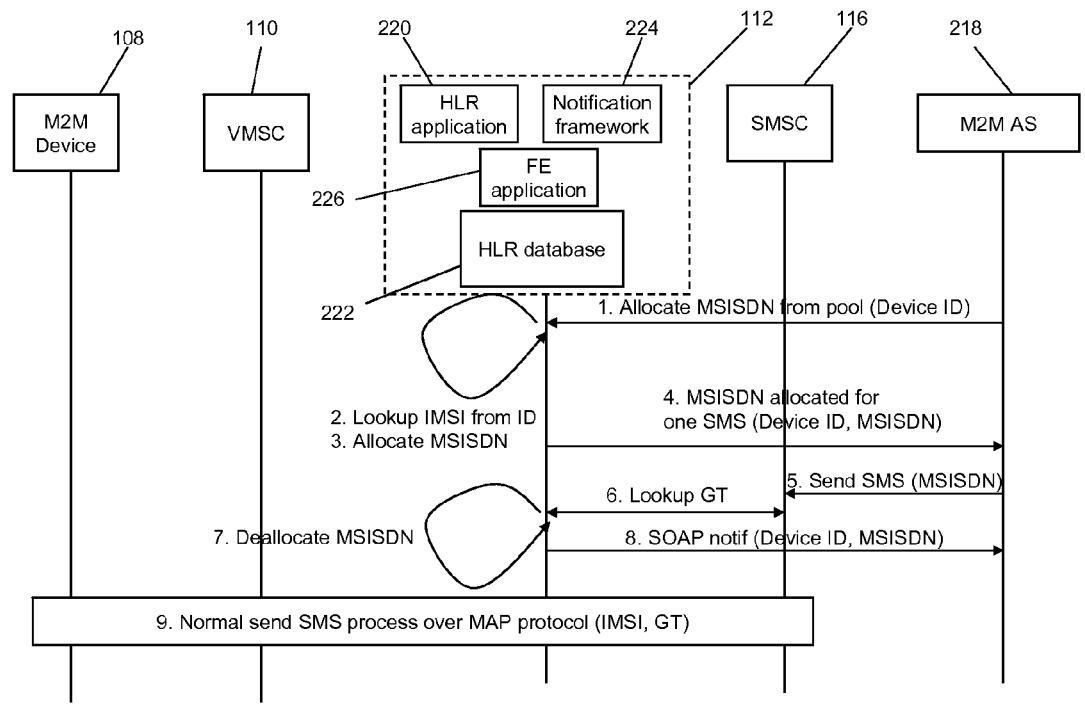
FIG. 2 shows a first message flow diagram.

As a preliminary step, not shown in FIG. 2, a number of M2M devices are provisioned to the M2M AS 218, meaning that the M2M AS 218 is configured to contain records having M2M specific data such as a device ID and an International Mobile Subscriber Identity (IMSI) for an M2M device. Provisioning also means that there is an association referred to as a tree branch is created linking the record in the M2M AS 218 with a corresponding subscription record containing subscriber data in the HLR platform 112 in respect the subscriber associated with that M2M device 108. In effect, this means that the FE application is provided with device IDs and corresponding IMSIs, for example in the form of a table, in order that the HLR database 222 can be changed based upon requests specifying device IDs.

The M2M device is also provisioned to the HLR database 222, meaning that there is a record for this subscriber containing the IMSI and the device executed a location update in the past, as a result of which the HLR application knows which is the serving VMSC. Provisioning of the HLR database 222 may include writing the IMSI to the subscription record for the first time. However, this may have been done earlier, for example by the network operator. Once the HLR database 222 has a subscription record containing an IMSI, a location update may be carried out once the device has been switched on at least for a first time.

During provisioning, a dummy MSISDN of the subscriber/the M2M device may be written to a subscription record of the HLR database 222 for the M2M device. In this case, the HLR does not support provisioning without an MSISDN. In an implementation in which a SIM may be provisioned without specifying an MSISDN, a dummy MSISDN does not have to be used. This is discussed more in the following. A dummy MSISDN is an MSISDN which is not globally routeable. A globally routeable number is one which is globally unique, that is not utilised in any other operator in the world, which is routeable around the world because if it is used for a purpose such as making a call or sending an SMS, the request will end up in the HLR of this operator.

It should be noted that in order to permit an M2M device to communicate with the M2M, it needs to know its own device ID, an address of the M2M AS 218, and an address of the SMSC.

Referring now to the steps shown in FIG. 2, in step 1 the M2M AS 218 sends an MSISDN change request to the FE application 226 requesting it to allocate an MSISDN, from a pool of MSISDNs available to the network operator, to a particular M2M device 108. The operator may have reserved a pool which is available to M2M service providers who are authorised by the operator to utilise the pool for their own ends. Sending the MSISDN change request starts a procedure to provide the particular M2M device 108 with a dynamically allocated MISISDN.

Such an MSISDN change request may be because the M2M AS 218 is to send a configuration message to the M2M device 108 or to request it to carry out an action such as providing specified information to the M2M AS 218. For the M2M device 108 to do this, it requires a valid MSISDN. The MSISDN change request contains, as a parameter, the device ID provisioned to the M2M AS 218 for that particular M2M device 108. In another embodiment, since the M2M AS may have both the IMSI and the device ID, the M2M AS may receive the device ID as input, and then send the IMSI to the HLR platform 112. In fact, it would also be possible not to provide to the HLR platform 112 with any device ID-IMSI mapping so that the HLR platform could operate on the basis of receiving IMSIs. However, it may be preferably, from the perspective of the M2M AS, for relevant/comprehensible names to be used for the M2M devices, such as SmartMeter1@ENERGYCO.

Also as part of step 1, the M2M AS 218 may request a notification service for changes of the MSISDN field of the device. This is a notification service specifically for that particular device, that is for the particular field called "MSISDN" of the record in the database belonging to the particular device. The notification framework 224 may generate a corresponding notification upon occurrence of the event "change of MSISDN field". In one particular example, the notification framework 224 may send a notification to the M2M AS 218 so that the M2M AS 218 knows that an MSISDN has been allocated to the M2M device 108.

In step 2, the FE application 226 uses the device ID provided in step 1 to look up an association between the device ID and the IMSI to which it corresponds. In this way, the FE application 226 is able to identify the IMSI to which the MSISDN change request relates.

In step 3, the FE application 226 allocates an MSISDN from the pool and provides it to the HLR application, together with an indication that this MSISDN relates to a particular IMSI so that the HLR application can introduce the MSISDN to the subscription record it maintains for the device (specifically for the subscriber associated with the device).

In step 4, the HLR platform, for example the FE application 226, uses a message containing the device ID and the MSISDN to notify the M2M AS 218 that an MSISDN has been allocated, so that M2M AS can send one or more SMSs to the M2M device. It should be noted that in this embodiment of the invention, the preceding steps occur as a result of the M2M AS deciding it wants to send an SMS to the M2M device.

As a result, in step 5, the M2M AS 218 starts to send an SMS to the M2M device according to a conventional SMS sending procedure.

In step 6 the SMSC performs a conventional global title (GT) address lookup operation with the HLR application 220, and therefore with the HLR database 222, for the M2M device in order to determine the address of the network element serving the M2M device, typically a visiting MSC (VMSC). In one embodiment of the invention, the FE application 226 has an internal, configurable timer of, say, 10 minutes, after which in step 7 it de-allocates the MSISDN. This means that the HLR database 222 is modified so that the MSISDN is no longer associated with the IMSI of the M2M device. Alternatively the M2M AS 218 may trigger de-allocation of the MSISDN itself once it has the knowledge that the SMS was successfully sent to the M2M device. The knowledge may come from the M2M device having contacted the M2M AS 218 as a result of receiving the SMS from the M2M AS 218.

Although in the foregoing description, SMS message delivery goes via a serving network element in the form of an MSC, SMS message delivery can instead go via a different type of network element, for example via a serving gateway support node (SGSN).

In an alternative embodiment, a trigger may be created by the M2M AS 218 to be sent a notification when there is a reading access to the MSISDN data associated with the device. A reading access is when any application in the HLR platform 112 reads an entry in a subscription record. Therefore, to give an example, when the SMSC 116 accesses the address of the serving network element of the M2M device, that is the global title address obtained by sending the MAP_SEND_ROUTING_INFO_FOR_SM message, as part of the conventional SMS sending procedure, the M2M AS 218 will be sent a corresponding notification and in response can trigger de-allocation of the MSISDN from the HLR database. In this case, a de-allocation request would come from a source external to the HLR platform 112. However, it is possible that in addition to an external de-allocation request, the HLR platform 112 may also have timer triggered de-allocation as discussed in the foregoing.

As a result of the de-allocation, either as a result of a expiry of a timer or because of the setting up of the notification service for changes in the MSISDN field for this subscriber, in step 8 the M2M AS 218 is notified of the de-allocation of the MSISDN. Of course, in a case in which the M2M AS 218 has triggered the de-allocation itself, this notification is not required. In any case, once the M2M AS 218 has been notified, or has triggered de-allocation itself, it knows that from this point on it cannot send another SMS to this device without re-starting the whole FIG. 2 procedure right from the beginning, that is step 1.

Figure 3:
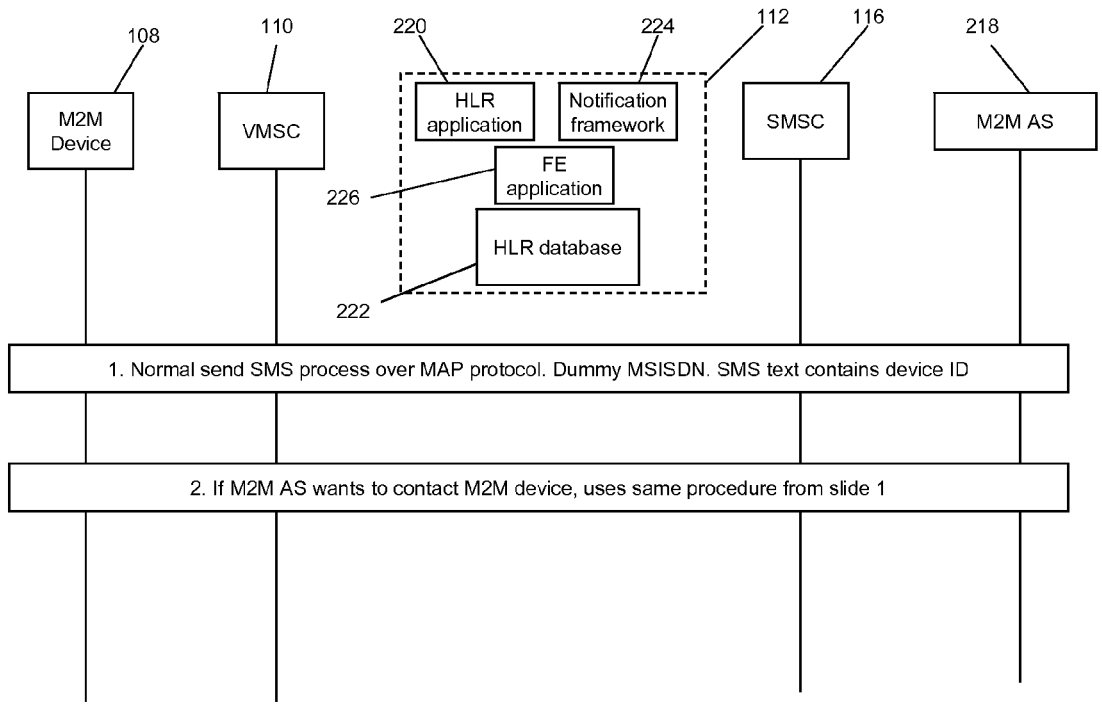
FIG. 3 shows a second message flow diagram.

FIG. 3 shows a second message flow diagram. This relates to a case in which the M2M device 108 is to send an SMS message to the M2M AS 218. It is assumed that the M2M device 108 has been provisioned to send SMS messages in the mobile network, that is the M2M device 108 has been provided with the address of the SMSC 116 and the MSISDN of the M2M AS 218 that it has to contact via SMS for any purpose. In addition, the M2M device is configured so that, in order to send an SMS message to the M2M AS 218, the SMS should contain, in the User Data part of the SMS-SUBMIT packet, the device ID, because the M2M device does not have a globally routable MSISDN and the M2M AS, receiving an SMS-DELIVER message with the Originator Address field filled by the network with the dummy MSISDN will not be able to identify the M2M device alone based on the dummy MSISDN, effectively a random number.

Figure 4:
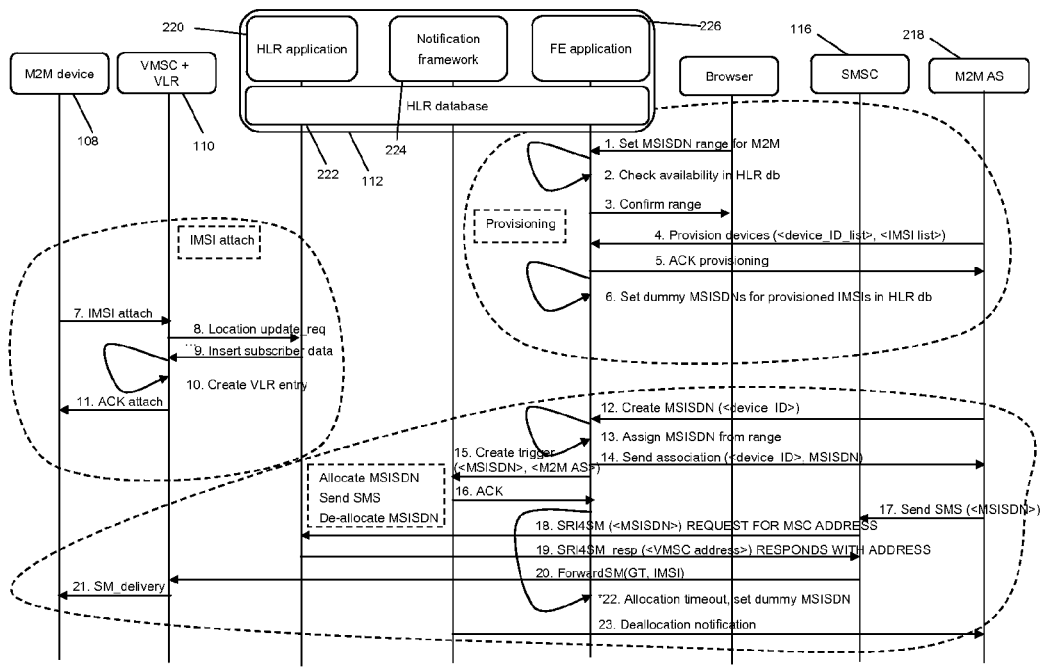
FIG. 4 shows a third message flow diagram.

FIG. 4 shows a third message flow diagram. This is a more detailed version of FIG. 2. It can be seen that the procedure of FIG. 4 has three main parts, a provisioning sub-procedure part, an IMSI attach sub-procedure part, and an MSISDN allocation sub-procedure part.

Referring to the first of these three sub-procedure parts, FIG. 4 shows a provisioning sub-procedure according to that described in the foregoing. In particular, a browser or user interface of the HLR platform 112 is used in step 1 to configure the FE application 226 with a MSISDN range for M2M, that is the pool of MSISDNs which are assigned to an entity controlling the M2M AS 218 which may be a particular service provider. If the range is available, step 2, they can be assigned as a pool of available MSISDNs to that entity. The FE application 226 confirms this in step 3.

Once the MSISDNs have been assigned for use by the M2M AS 218, in step 4 it provisions the HLR platform 112 with a list of device IDs and a list of IMSIs, each device ID corresponding to one of the IMSIs. This provisioning is acknowledged in step 5.

In a final step, step 6, of the provisioning sub-procedure, the HLR platform may configure the HLR database 222 with dummy MSISDNs for provisioned IMSIs if the HLR database 222 requires there to be an MSISDN provided for a subscription record. The dummy MSISDNs may simply be arbitrary strings of numbers. Although the dummy MSISDNs will be different with respect to each other, in another embodiment, they may be the same dummy MSISDN.

Referring to the second of these three sub-procedure parts, FIG. 4 shows a conventional IMSI attach procedure for a mobile terminal, in this case for the M2M device 108. When the M2M device first registers with the network, and/or periodically thereafter, it sends an IMSI attach message to its serving VMSC 110 in step 7, the VMSC 110 sends a location update to the HLR application 220 (which is then used to provide an update-to-date location entry in the corresponding subscription record in the HLR database 222) in step 8 which causes an insert subscriber data message to be sent from the HLR platform 112 to the VMSC 110 in step 9. This causes the VLR associated with the VMSC 110 to create a suitable entry in step 10 and the VMSC 110 sends an acknowledgement to the M2M device 108 in step 11.

As a result, the HLR database 222 contains for each subscriber an IMSI and a location. It may be also contain a dummy MSISDN.

Referring to the third of these three sub-procedure parts, FIG. 4 shows an MSISDN allocation procedure according to that described in the foregoing in relation to FIG. 2 and so it will not be described in detail here. A couple of points should be noted. The global title (GT) address lookup operation is shown in more detail than in FIG. 2 and de-allocation is shown in some detail.

In FIG. 4, de-allocation in the HLR database 222 occurs as a result of time-out, shown represented by the loop starting after step 16 and terminating at step 22. De-allocation in the M2M AS occurs as a result of a de-allocation notification in step 23, a trigger for which is set up in steps 15 and 16.

De-allocation will now briefly be explained. When the FE application 226 sends a notification in step 14 of an allocated MSISDN, it also creates a trigger in the notification framework 224 to monitor the record containing the MSISDN in the HLR database 222 to check for changes in the MSISDN. After this, a time-out timer is started to provide a period of time during which the SMS message may be delivered. In other words, the time-out period sets the allocation period of the MSISDN to the M2M device. When the time-out timer has exAired, the FE application 226 overwrites, in step 22, the allocated MSISDN in the HLR database 222 with a dummy MSISDN. This enables the allocated (now de-allocated) MSISDN to be returned to the pool so that it may be used by a subsequent M2M device for a similar purpose. Because the notification framework 224 is monitoring the record containing the MSISDN and looking for changes in the MSISDN, in response to the overwriting occurring, the notification framework 224 sends a de-allocation notification to the M2M AS 218 in step 23. The M2M AS 218 then knows that it should no longer use that MSISDN unless it is re-allocated, perhaps to a different M2M device 108.

In an alternative de-allocation procedure, it may be desired not to assume a certain allocation period and so the M2M AS 218 follows up the "service process" for which the SMS message was sent. Accordingly, the M2M AS 218 may de-allocate the MSISDN explicitly when the "service process" is over. The term "service process" may refer to the reason that the SMS is sent to the M2M device and any consequent acknowledgement or feedback from the M2M device. If feedback is received in the form of an SMS received from the device or an IP connection established from the device to the M2M AS, then the "service process" is complete, and the MSISDN can be de-allocated. Since only the M2M AS knows that the "service process" is complete, only the M2M AS may know when the MSISDN should be de-allocated.

Figure 5:
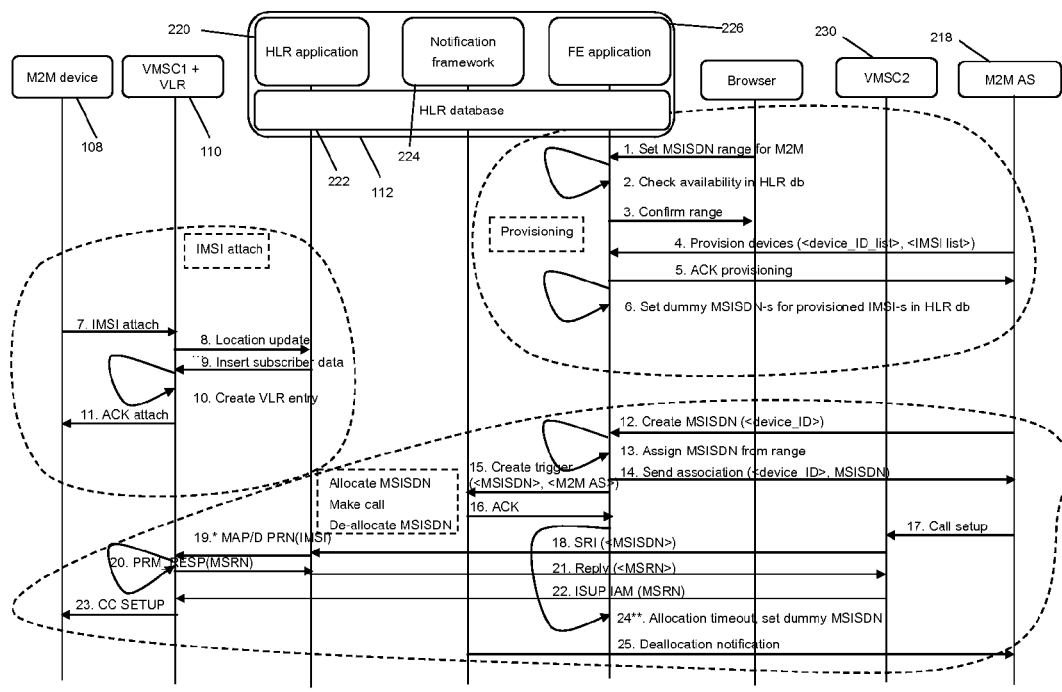
FIG. 5 shows a fourth message flow diagram.

FIG. 5 shows a fourth message flow diagram. This is closely corresponds to the procedure of FIG. 4 and likewise has three main parts, a provisioning sub-procedure part, an IMSI attach sub-procedure part, and an MSISDN allocation sub-procedure part. The provisioning sub-procedure part and the IMSI attach sub-procedure part are the same as those parts of FIG. 4 and will not be described in detail here.

The difference between FIG. 4 and FIG. 5 is that the latter is concerned with allocating an MSISDN in order for the M2M AS 218 to make a call to the M2M device 108. Accordingly, there is no SMSC involved in this procedure but instead, there is an MSC, the VMSC2 230, serving the M2M AS 218 in addition to the MSC serving the M2M device 108, that is VMSC1 110. Furthermore, a call set-up step 17 leads to exchange of call set-up messages between various network elements such as those exchanged in steps 18 to 23 between the M2M AS 218, the VMSC2 230, the HLR application 220, and the VMSC1+VLR 110. In an embodiment of the invention based upon a call to an M2M device rather sending of an SMS message, the call may be sent to wake up the M2M device. It may be a voice call.

Although in the foregoing, a mobile communications system is shown having a single M2M AS 218, there may be several M2M ASs. In this case, each M2M AS 218 carries out its own provisioning sub-procedure to have reserved for it a range/pool of MSISDNs. There can be a global pool of MSISDNs provided by the CSP, or alternatively, a range/pool of MSISDNs for each M2M AS. Furthermore, each M2M ASs will seek MSISDN allocation for one of its M2M device as the need arises.

It can be seen that according to the invention, an MSISDN is generated dynamically for the M2M device when there is a need for it to have a globally routeable identifier, at least for a certain period/time interval during when it is valid. In addition, once the M2M device 108 has been provided with a valid MSISDN, entities other than the M2M AS may by sent a notification of the MSISDN number allocation so that they can start communicating with the M2M device themselves. The generated MSISDN is de-allocated after the SMS-based or call-based communication is closed or after a predefined time period and any relevant entities may be notified of the de-allocation. After the de-allocation the MSISDN may be used for another M2M device in a subsequence allocation procedure.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method, comprising:
    sending from an application server, a request for a pre-provisioned routing identifier;
    in response to the request from the application server, dynamically allocating for a period of time, the pre-provisioned routing identifier from a pool of pre-provisioned routing identifiers for a subscription when there is a need for communication from the application server towards a device operating according to the subscription;
    using the request to create an association between the pre-provisioned routing identifier and a subscription identifier in a subscription database; and
    de-allocating the pre-provisioned routing identifier,
    wherein the de-allocation occurs in connection with one or several processes selected from the following:
        a process of the application server sending a message to the device, or a process of the application server calling the device.

2. The method according to claim 1, wherein an end of the time period is defined by a lapse of a specific amount of time.

3. The method according to claim 1, wherein an end of the time period is defined by an event occurring.

4. The method according to claim 1, wherein de-allocation occurs both in the subscription database as a result of a modification event of the subscription database, and in the application server which receives a notification of the modification.

5. The method according to claim 1, wherein a reading access to the subscription database triggers a notification to be sent.

6. The method according to claim 1, wherein the request for the routing identifier contains a subscription identifier.

7. The method according to claim 1 wherein, in a provisioning sub-procedure, the subscription database is configured with dummy routing identifiers which are not used for routing.

8. An apparatus, comprising:
    at least one processor; and
    at least one memory including computer program code,
        wherein the at least one memory and the computer program code are configured to, with the at least one processor, cause the apparatus to, at least,
        send from an application server, a request for a pre-provisioned routing identifier;

in response to the request from the application server, dynamically allocate for a period of time, the pre-provisioned routing identifier from a pool of pre-provisioned identifiers for a subscription when there is a need for communication from the application server towards a device operating according to the subscription;

using the request, create an association between the pre-provisioned routing identifier and a subscription identifier in a subscription database; and de-allocate the pre-provisioned routing identifier by the application server, wherein the de-allocation occurs in connection with one or several processes selected from the following:
- a process of the application server sending a message to the device, or
- a process of the application server calling the device.

9. An apparatus comprising:
a subscription database;
a front end which is configured to communicate with an application server; and
a database handling part configured to modify the subscription database, wherein the front end is configured to
  receive, from the application server, a request for a pre-provisioned routing identifier,
  in response to the request from the application server, dynamically allocate for a period of time, the pre-provisioned routing identifier from a pool of pre-provisioned routing identifiers for a subscription when there is a need for communication from the application server towards a device operating according to the subscription,
  allocate the pre-provisioned routing identifier to a subscription, and wherein the database handling part is configured to create an association between the pre-provisioned routing identifier and a subscription identifier in the subscription database,
wherein, following allocation, the apparatus is configured to de-allocate the pre-provisioned routing identifier, and
wherein the de-allocation occurs in connection with one or several processes selected from the following:
- a process of the application server sending a message to the device, or
- a process of the application server calling the device.

10. A communication system, comprising:
an application server configured to send a request for a pre-provisioned routing identifier; and
a database application configured to
  receive the pre-provisioned request,
  in response to the request from the application server, dynamically allocate for a period of time, the pre-provisioned routing identifier from a pool of pre-provisioned routing identifiers for a subscription when there is a need for communication from the application server towards a device operating according to the subscription,
  allocate the pre-provisioned routing identifier to a subscription, and
  use the request to create an association between the pre-provisioned routing identifier and a subscription identifier in a subscription database,
wherein, following allocation, the system is configured to de-allocate the pre-provisioned routing identifier, and
wherein the de-allocation occurs in connection with one or several processes selected from the following:
- a process of the application server sending a message to the device, or
- a process of the application server calling the device.

11. A computer program product comprising software code embodied on a non-transitory computer-readable medium, said software code, when executed on a computing system, controls the computing system to perform a method, comprising:

sending from an application server a request for a pre-provisioned routing identifier;

in response to the request from the application server, dynamically allocating for a period of time, the pre-provisioned routing identifier from a pool of pre-provisioned routing identifiers for a subscription when there is a need for communication from the application server towards a device operating according to the subscription;

using the request to create an association between the pre-provisioned routing identifier and a subscription identifier in a subscription database; and de-allocating the pre-provisioned routing identifier, wherein the de-allocation occurs in connection with one or several processes selected from the following:
- a process of the application server sending a message to the device, or
- a process of the application server calling the device.

* * * * *